(12) United States Patent
Sharma et al.

(10) Patent No.: US 7,127,112 B2
(45) Date of Patent: Oct. 24, 2006

(54) SYSTEMS FOR SPECTRAL MULTIPLEXING OF SOURCE IMAGES TO PROVIDE A COMPOSITE IMAGE, FOR RENDERING THE COMPOSITE IMAGE, AND FOR SPECTRAL DEMULTIPLEXING OF THE COMPOSITE IMAGE BY USE OF AN IMAGE CAPTURE DEVICE

(75) Inventors: Gaurav Sharma, Webster, NY (US); Robert P. Loce, Webster, NY (US); Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 642 days.

(21) Appl. No.: 10/304,171

(22) Filed: Nov. 25, 2002

(65) Prior Publication Data

US 2004/0101201 A1 May 27, 2004

(51) Int. Cl.
G06K 9/36 (2006.01)
G06K 9/46 (2006.01)

(52) U.S. Cl. .............. 382/232; 382/254; 382/162; 382/191; 348/584

(58) Field of Classification Search .......... 382/100, 382/232, 254, 162, 191; 283/91; 348/584; 345/629; 235/649
See application file for complete search history.

(56) References Cited

U.S. PATENT DOCUMENTS

| 3,234,663 | A | 2/1966 | Ferris et al. ............ 35/2 |
| 3,969,830 | A | 7/1976 | Grasham .............. 35/2 |
| 4,290,675 | A | 9/1981 | Beiser ................ 354/112 |
| 4,586,711 | A | 5/1986 | Winters et al. ........ 273/138 R |
| 4,824,144 | A | 4/1989 | Tasma ............... 283/87 |
| 5,371,627 | A | 12/1994 | Baccei et al. ........... 359/462 |
| 5,398,131 | A | 3/1995 | Hall et al. ............ 359/465 |
| 5,491,646 | A | 2/1996 | Erskine .............. 364/526 |
| 5,594,841 | A | 1/1997 | Schutz .............. 395/119 |
| 5,715,316 | A * | 2/1998 | Steenblik et al. ......... 380/54 |
| 6,301,044 | B1 | 10/2001 | Huber et al. ............ 359/483 |
| 6,333,757 | B1 | 12/2001 | Faris ................ 348/60 |
| 6,373,974 | B1 * | 4/2002 | Zeng ............... 382/135 |
| 6,404,464 | B1 * | 6/2002 | Faris et al. ............ 349/15 |
| 6,766,045 | B1 * | 7/2004 | Slepyan et al. .......... 382/135 |
| 2002/0136435 | A1* | 9/2002 | Prokoski .............. 382/118 |
| 2005/0231576 | A1* | 10/2005 | Lee et al. ............ 347/100 |

OTHER PUBLICATIONS

Article entitled "Light Sources", pp. 151-176, from the book entitled The Reproduction of Colour in Photography, Printing & Television, Fourth Edition, by Dr. R. W. G. Hunt.

(Continued)

Primary Examiner—Jingge Wu
Assistant Examiner—Ali Bayat
(74) Attorney, Agent, or Firm—Mark Z. Dudley

(57) ABSTRACT

Methods and systems for spectrally-encoding plural source images and for providing the spectrally-encoded plural source images in a composite image, for rendering the composite image on a substrate, and for recovering at least one of the encoded source images from the rendered composite image. A desired source image is recovered when the rendered composite image is subjected to illumination by one or more illuminants and the desired source image is detected by one or more sensors in an image capture device. The spectral characteristics of the colorants, illuminants, and sensors are employed to spectrally encode the source image in the composite image.

32 Claims, 6 Drawing Sheets

OTHER PUBLICATIONS

Article entitled "An Introduction To Appearance Analysis", pp. 1-7, from the publication "SECONDSIGHT", SS No. 84, A reprint from GAFTWorld, the magazine of the Graphic Arts Technical Foundation, by Richard W. Harold.

Article entitled "Electronic Copyright Protection", from the publication "Photo Electronics Imaging", pp. 16-21, vol. 37, No. 6 (1994), by Sapwater etal.

* cited by examiner

SYSTEMS FOR SPECTRAL MULTIPLEXING OF SOURCE IMAGES TO PROVIDE A COMPOSITE IMAGE, FOR RENDERING THE COMPOSITE IMAGE, AND FOR SPECTRAL DEMULTIPLEXING OF THE COMPOSITE IMAGE BY USE OF AN IMAGE CAPTURE DEVICE

CROSS-REFERENCE TO RELATED APPLICATIONS

Cross-reference is made to the following co-pending and commonly-owned applications:

U.S. application Ser. No. 10/268,394, filed Oct. 9, 2002 by Steven J. Harrington et al. and respectively entitled "Systems for spectral multiplexing of source images to provide a composite image, for rendering the composite image, and for spectral demultiplexing of the composite image to animate recovered source images".

U.S. application Ser. No. 10/268,295, filed Oct. 9, 2002 by Steven J. Harrington et al. and respectively entitled "Systems for spectral multiplexing of source images including a stereogram source image to provide a composite image, for rendering the composite image, and for spectral demultiplexing of the composite image".

U.S. application Ser. No. 10/268,505, filed Oct. 9, 2002 by Steven J. Harrington et al. and respectively entitled "Systems for spectral multiplexing of source images including a textured source image to provide a composite image, for rendering the composite image, and for spectral demultiplexing of the composite image".

U.S. application Ser. No. 10/268,333, filed Oct. 9, 2002 by Gaurav Sharma et al. and respectively entitled "Systems for spectral multiplexing of source images to provide a composite image, for rendering the composite image, and for spectral demultiplexing of the composite image".

U.S. application Ser. No. 10/268,575, filed Oct. 9, 2002 by Gaurav Sharma et al. and respectively entitled "Systems for spectral multiplexing of source images to provide a composite image with gray component replacement, for rendering the composite image, and for spectral demultiplexing of the composite image".

U.S. application Ser. No. 10/268,246, filed Oct. 09, 2002 by Robert P. Loce et al. and respectively entitled "Systems for spectral multiplexing of a source image and a background image to provide a composite image, for rendering the composite image, and for spectral demultiplexing of the composite images".

U.S. application Ser. No. 10/268,271, filed Oct. 09, 2002 by Yeqing Zhang et al. and respectively entitled "Systems for spectral multiplexing of source images to provide a composite image, for rendering the composite image, and for spectral demultiplexing the composite image, which achieve increased dynamic range in a recovered source image,".

U.S. application Ser. No. 10/268,241, filed Oct. 09, 2002 by Yeqing Zhang et al and respectively entitled "System for spectral multiplexing of source images to provide a composite image with noise encoding to increase image confusion in the composite image, for rendering the composite image, and for spectral demultiplexing of the composite image,".

FIELD OF THE INVENTION

The present invention relates to a system or systems for spectrally multiplexing a plurality of source images so as to provide a composite image, rendering the composite image, and demultiplexing of such a composite image to recover one or more of the source images.

BACKGROUND OF THE INVENTION

Data hiding is the process of encoding extra ("steganographic") information in digital data, such as in images, by making small modifications to the data. Hidden information in images may be used to supplement an image with additional information, or to verify some aspect of the image, such as origin or the integrity of the image.

Technology for producing images which contain steganographic information, such as in the form of digital watermarks, is known. Commercial products which can store and read digital watermarks are widely available. The embedded data typically remains with the image when it is stored or transmitted. The embedded data may be meant to be extracted by an end user, or hidden to the end user. Some of these techniques (e.g., glyphs or bar codes) use areas outside of the image area because the techniques are largely destructive of the image itself and require a uniform background to read the information.

It is also known to print patterns in different colors on a substrate such that the patterns may be viewed through one or more filters having certain correlated colors, such that the patterns will change, depending upon the colors involved. It is also known to print characters in different colors in an overlapping relationship such that the overlapped characters, when viewed through one colored filter, will give the appearance of only certain ones of the superimposed characters, and when viewed through a second and differing colored filter, will reveal certain other ones of the superimposed characters. Such approaches are known for encoding information to prevent recognition of the information content of the pattern until the pattern is decoded and made comprehensible. These approaches have been applied to promotional gaming technology and in document security and document verification applications.

Means have been used to physically alter a secure document so as to subsequently enable the marked document to be authenticated: by the use of special fibers, threads, chips, fluorescent platelets and particles, and fluorescent or phosphorescent inks, for example. Other techniques such as the adhesion of logos, labels, magnetic strips, or stickers to an image are employed, but these can be easily removed or hidden, and these devices can also be unsightly. Most of such approaches require that a specially modified scanning device be employed, such as by inclusion of a magnetic detector, for recovery of hidden information.

Methods are known for printing documents in a way to thwart unauthorized copying by use of modern color copiers. Most of them are based on altering the background of the original in order that the contrast may be reduced. Since the human eye and the scanner in the copier have different sensitivities for lightness values of colors, it has been attempted to darken the background during copying to a relatively larger extent for the sensor than for the eye.

There is a need for a system for the production of printed images on substrates, such as secure documents, that may be authenticated by an automated detection process. Such images should be secure against unauthorized reproduction or origination (e.g., substantially adverse to counterfeiting), be readily identifiable in the automated detection process, and substantially tamper-proof with respect to alteration of its embedded information.

SUMMARY OF THE INVENTION

Accordingly, the present invention is directed to method for embedding a source image in a single composite image, and a method for recovery of such a source image.

The present invention is directed to a method and system for encoding and rendering composite images and for subsequent detection and recovery of a source image from the composite image. A rendered composite image is formed by generating a composite image and rendering same on a substrate such as paper so that the rendered composite image is resistant to tampering, unauthorized copying, and also prevents removal of the image and substitution of another image in its place.

The invention is also directed to a method and system for producing security documents and to an automatic authentication system for such security documents. With the present invention, the document contains a rendered composite image wherein embedded information is hidden from normal view but the embedded information can be detected by use of an image capture device in order to validate the document. The detection and validation can be done entirely automatically, thus decreasing the need for human intervention.

Spectral multiplexing, as used herein, refers to a process for encoding plural source images in a composite image. Composite image rendering refers to a process for rendering the composite image in a physical form on a substrate. Spectral demultiplexing refers to a process for recovering at least one of the encoded source images from the rendered composite image, such that the recovered source image is made distinguishable from, or within, the composite image, by capturing the rendered composite image by use of one or more image capture devices to recover the desired source image.

Accordingly, the present invention is directed to methods and systems for spectrally-encoding plural source images and for providing the spectrally-encoded plural source images in a composite image; for rendering the composite image by imagewise deposition or integration of selected colorants on a substrate; and for recovering at least one of the encoded source images from the rendered composite image. In particular, methods and systems of the present invention are directed to such encoding, rendering, and recovery of the desired source when the rendered composite image is to be subjected to illumination by one or more illuminants and the source image is then detectable by one or more sensors operable in an image capture device. The spectral characteristics of the colorants, illuminants, and sensors are employed in mathematical determinations to optimally encode the source images in the composite image such that at least one selected source image is uniquely recoverable under predetermined settings and operational characteristics of a selected image capture device.

Each source image is spectrally encoded by mapping values representative of each source image pixel to a corresponding pixel value in one or more of a plurality of colorant image planes. The contemplated encoding, in its simplest form, may include the conversion of each source image to a monochromatic, separation image, which is then directly mapped to a corresponding colorant image plane in the composite image. A plurality of source images can thereby be mapped to a corresponding plurality of colorant image planes in the composite image. An illuminant that is designed to particularly interact with a given colorant is said to be complementary, and vice versa.

The plural monochromatic separations are designed to be combined in the composite image, which in turn will control the amount of one or more pre-selected colorants to be deposited on the substrate. In one possible example, each colorant is assigned to a respective colorant image plane of the composite image, and the colorant values in the respective colorant image planes represent the relative amounts of colorant deposited in the rendered composite image. For example, a rendered composite image may be rendered using cyan, magenta, and yellow colorants that are deposited over a given area on a substrate by a rendering device.

A composite image file composed of the plural colorant image planes may be stored or transmitted as composite image file. The composite image may then be physically realized by delivering the composite image file to a rendering device with instructions for rendering the composite image on a substrate using the identified colorant or array of colorants. One suitable embodiment of a rendering device therefore includes a digital color electrophotographic printer.

In the contemplated encoding scheme, the mapping of each source image is performed according to mathematical determinations described herein for optimizing the effect of the following on the composition, rendering, and demultiplexing of the composite image: (a) the spectral absorption characteristics of the colorants selected for rendering the composite image, such spectral absorption characteristics especially comprehending the interaction of plural colorants when such are combined on the substrate; (b) the spectral radiance characteristic of the illuminant(s) that will be used to illuminate the composite image for recovering the source image; and (c) the spectral response characteristic of the sensors(s) in an image capture device that are used to sense the rendered composite image during such illumination, for recovery of the desired source image. The optimization is performed so as to provide at least one source image in the composite image that is uniquely recoverable by a selected image capture device operable according to the demultiplexing method described herein, and that is otherwise difficult or impossible to recover by other apparatus or methods.

For example, as illustrated in FIG. 1, in addition to absorbing in its primary red absorption band, the typical cyan colorant also exhibits unwanted absorption in the green and blue regions of the visible spectrum. Likewise, the typical magenta colorant has significant absorption in the blue region in addition to its primary green absorption band. The typical yellow colorant has somewhat improved performance, in that it exhibits negligible absorption in the red region of the spectrum and a relatively minor amount of absorption in the green region; most of its absorption is restricted to the blue region.

The spectral absorption characteristics shown in FIG. 1 are fairly typical of the commonly-available colorants used in printing and publishing. From the foregoing description, one will now recognize that the colorants that are most commonly available exhibit certain absorption characteristics outside of their primary absorption bands. Also, some illuminant sources produce illuminants that have partially overlapping spectra. If multiple source images are encoded without optimization and rendered using practical (i.e., non-ideal) colorants, the recovered source images may be found to interfere with each other and therefore may not be recoverable as separate images under the corresponding fields of illumination from a practical illuminant source.

With reference to FIG. 2, for example, when a non-optimally rendered composite image is subject to CRT-based green illumination, due to the unwanted absorption in a cyan colorant in the green region of the spectrum, a first source image may be recovered along with a second source image having a primary absorption band in the green region of the spectrum. Likewise, under CRT red illumination, due to the unwanted absorption of a magenta colorant in the red region, along with the first source image, the second source image may also be recovered.

In consideration of this interaction between commonly-available colorants and commonly-available narrow band illuminants, spectral characterizations of the colorants and the illuminants, coupled with a characterization of the spectral sensitivity of the sensors, may be predetermined, and accordingly selectable, so that the interaction of these characteristics can be optimized and used to an advantage. With proper optimization, one can produce rendered composite images that, when subjected to a particular combination of illuminant and sensor, will promote recovery of only the correspondingly desired source image, whereby the recovered source image is substantially free of components of the other source images. However, when an attempt is made, without benefit of the optimization described herein, to generate, render, and recover a particular source image from a composite image, the recovered source image will be degraded or confused due to, for example, the unwanted presence of image components from the other source images present in the composite image. The recovery of a degraded source image, or of image data that is not representative of the desired source image, thus indicates that the rendered composite image is improper and thus, in some applications, deemed counterfeit.

Accordingly, the present invention is directed to a system for spectrally-encoding plural source images and for providing the spectrally-encoded plural source images in a composite image.

The present invention is also directed to a system for rendering a spectrally-multiplexed composite image on a substrate.

The present invention is also directed to a system for spectral demultiplexing of a source image presented in a composite image presented on a substrate.

In the present invention, the demultiplexing is preferably achieved using an electronic image capture device such as a digital scanner or digital camera. The use of an electronic image capture device offers several advantages. Such devices recover individual pixel signals in one or more sensor color channels under wide-band illumination; each channel's spectral sensitivity is predeterminable. If an image capture device is employed, having multiple sensor channels, the individual channels may be used in the demultiplexing process or a mathematical combination of the channels may be employed. The sensitivities of these devices may also be advantageously designed to optimize the recovery of a single source image without interference of the other source images. The colorants used for producing the images can also be pre-selected for their unique spectral characteristics and their relationship to the spectral sensitivity of the image capture sensor device.

In a feature of the present invention, a desired source image presented in a rendered composite image is demultiplexed when the composite image is captured and processed by an electronic image capture device, such as a color scanner, having predetermined spectral sensitivity characteristics.

In another feature of the present invention, primary image data representative of a plurality of disparate source images may be spectrally encoded to form secondary image data representative of a composite image. The source images are encoded as a multiplicity of colorant image planes according to the spectral characteristics of the colorants and their interaction and the spectral response characteristics of at least one electronic image capture sensor device. The composite may be stored as composite image file. The composite image may then be physically realized by rendering the composite image using a selected array of colorants deposited on a substrate, with each colorant being assigned to a respective colorant image plane of the composite image. When the rendered composite image is captured by a selected electronic image capture device, a desired source image selected from the plurality of original source images is revealed. The recovered source image may be embodied in image data that is processed and presented to an operator via a display on a visual display device, or the recovered source image data that is captured by the electronic device may be compared to a standard or interpreted for other purposes through subsequent image processing and analysis.

An embodiment of the system for spectral multiplexing of plural source images includes a spectral multiplexer for receiving image data representative of a plurality of source images and for processing the image data to encode the plurality of source images into a composite image data signal.

An embodiment of the spectral multiplexer may be provided in the form of a computer for receiving image data files representative of a plurality of source images and for encoding the image data files as a composite image data file, and a composite image file storage and/or transmission means connected to the computer.

An embodiment of the system for rendering the composite image includes an image recording device which is responsive to the system for spectral multiplexing for receiving the composite image data file and for rendering the corresponding composite image on a substrate.

An embodiment of the image recording device may be provided in the form of a printer connected to the composite image file storage and/or transmission means, for printing the composite image on a substrate.

An embodiment of the printer may include colorants in the form of cyan, yellow, and black pigments, inks, or dyes selected for their spectral response when exposed to at least one illuminant.

An embodiment of the system for spectral demultiplexing of a rendered composite image may include a demultiplexer having an image capture device operable for subjecting the rendered composite image on a substrate to illumination by an illuminant having a selected spectral power distribution, whereupon the recovered source image is sensed by a detector having a selected spectral sensitivity, such that at least one of the encoded source images is recovered.

An embodiment of the demultiplexer may include an illuminant source responsive to manual control, or a controller and an illuminant source responsive to control by illuminant source control signals provided by the controller.

An embodiment of the controller may include a computer, operable according to control programs for generating one or more of the illuminant source control signals, and an illuminant source responsive to the illuminant source control signals for generating a defined field of illumination of one or more illuminants, whereby a rendered composite image on a substrate may be located within the field of illumination and thereby subjected to illumination by the illuminants.

Accordingly, and another feature of the present invention, the plurality of source images are processed in a digital image processing system utilizing specialized digital image processing and color science concepts, and renders the resulting calibrated composite image using a calibrated rendering device. The rendered composite image may be subsequently demultiplexed by operation of an image capture device, whereby the rendered composite image is demultiplexed and at least one of the source images is detected as a recovered source image.

DESCRIPTION OF THE INVENTION

Definitions of Terms

Figure 1:
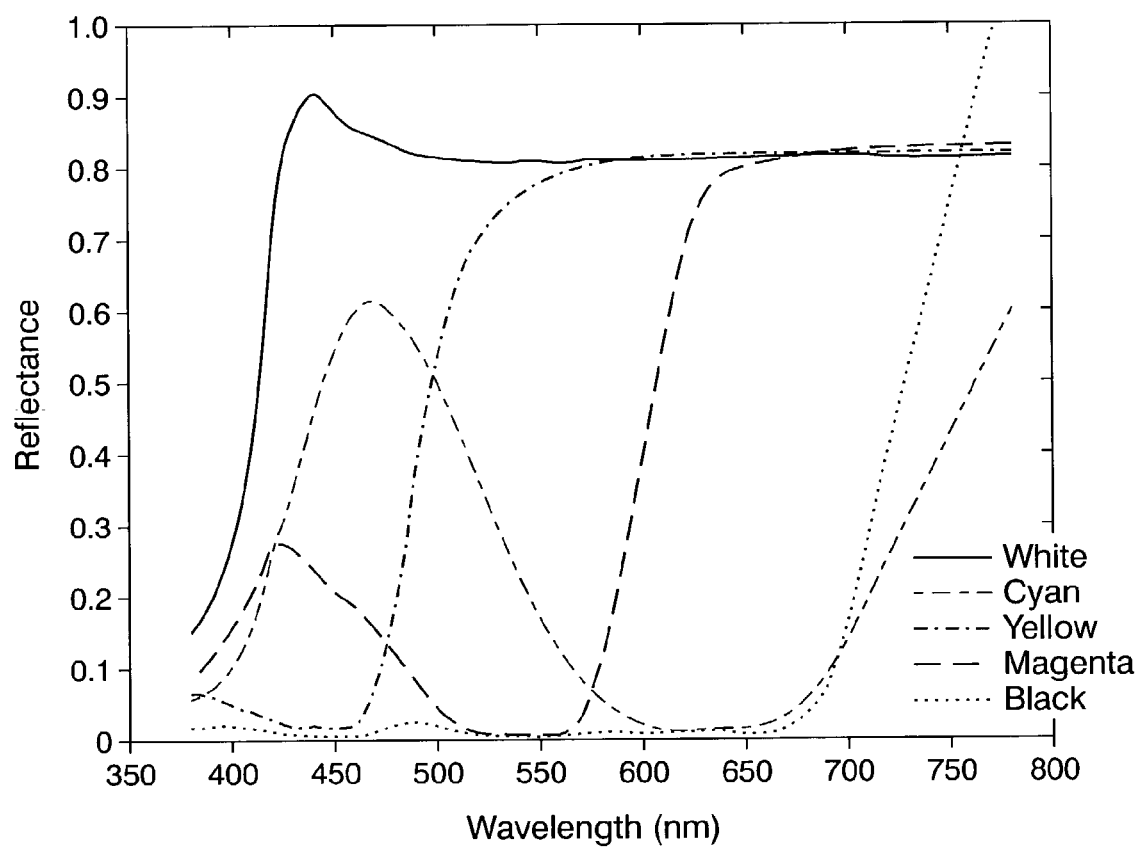
FIG. 1 represents reflectance spectra for a white paper substrate and colorants in the form of Cyan, Magenta, Yellow, and Black dyes (at 100% density) operable in a dye sublimation printer.

Color—A color can be uniquely described by three main perceptual attributes: hue, denoting whether the color appears to have an attribute according to one of the common color names, such as red, orange, yellow, green, blue, or purple (or some point on a continuum); colorfulness, which denotes the extent to which hue is apparent; and brightness, which denotes the extent to which an area appears to exhibit light. Light sources used to illuminate objects for viewing are typically characterized by their emission spectrum and to a reduced degree by their color temperature, which is primarily relevant for characterization off sources with a spectrum similar to a black body radiator. See, for instance, Hunt, R. W. G., *Measuring Colour*, Ellis Horwood, 1991, and Billmeyer and Saltzman, *Principles of Color Technology*, 3rd Ed. (Roy S. Berns), John Wiley & Sons, 2000.

Colorant—A dye, pigment, ink, or other agent used to impart a color to a material. Colorants, such as most colored toners, impart color by altering the spectral power distribution of the light they receive from the incident illumination through two primary physical phenomenon: absorption and scattering. Color is produced by spectrally selective absorption and scattering of the incident light, while allowing for transmission of the remaining light. A narrow band (absorbing) colorant exhibits an absorption band that is situated in a substantially narrow region of the visible region of the spectrum. Cyan, magenta and yellow colorants are examples of narrow band colorants that selectively absorb red, green, and blue spectral regions, respectively. Some colorants, such as most colored toners, impart color via a dye operable in transmissive mode. Other suitable colorants may operate in a reflective mode. An illuminant that is designed to particularly interact with a given colorant is said to be complementary, and vice versa.

Composite Image—An array of values representing an image formed as a composite of plural overlaid (or combined) colorant image planes. Source images may be encoded as described herein and the resulting image planes are combined to form a composite image.

Density (Optical)—The degree of darkness of an image. Higher density values represent greater darkness. Mathematically, optical density is defined as the negative logarithm of the reflectance or transmittance. The spectral density is correspondingly the negative logarithm of the reflectance/transmittance spectrum.

Gamut—A range of colors; typically, the range of colors that can be produced by a device.

Grayscale—Image data representing one of a series of tones stepped from light to dark.

Gray Component Replacement (GCR)—A technique whereby black ink is used to replace a portion of common darkness of component colorants.

Image—An image may be described as an array or pattern of pixels that are mapped in a two-dimensional format. The intensity of the image at each pixel is translated into a numerical value which may be stored as an array that represents the image. An array of numerical values representing an image is referred to as an image plane. Monochromatic or black and white (gray scale) images are represented as a two-dimensional array where the location of a pixel value in the array corresponds to the location of the pixel in the image. Multicolor images are represented by multiple two-dimensional arrays.

Figure 2:
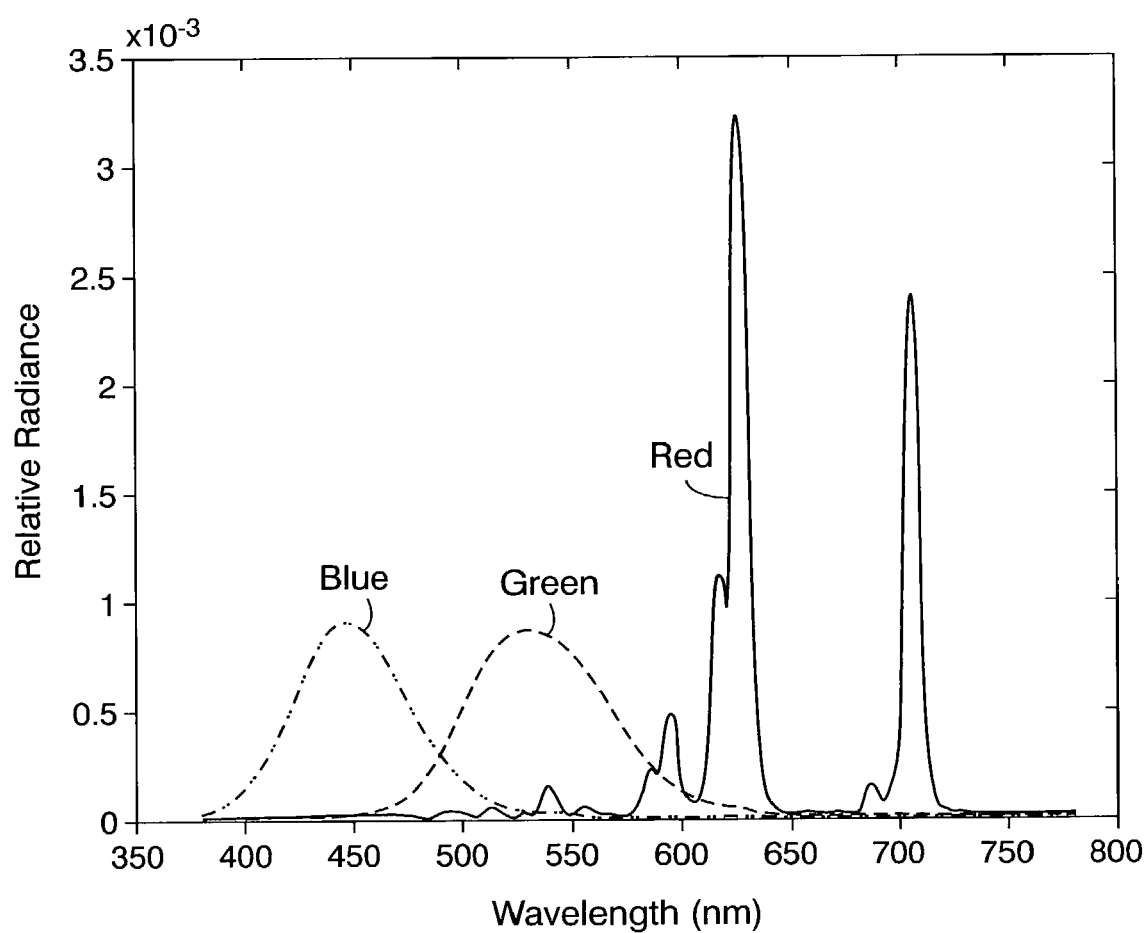
FIG. 2 represents the relative radiance spectra for the red, green, blue primaries generated by a typical cathode ray tube (CRT).

Illuminant—Incident luminous energy specified by its relative spectral power distribution; typically provided by a real or imaginary light source having a predefined spectral power distribution. A narrow band illuminant is an illuminant having a spectral power distribution that is substantially limited to a narrow region of the spectrum. The bandwidth of the region may vary from extremely narrow for a LASER source, to narrow band illuminants such as natural or artificial light transmitted through a band-limited color filter. Examples of red, green and blue narrow band illuminants are shown in FIG. 2, which illustrates the spectral power distributions obtained from activated red, green, and blue phosphors in a typical CRT.

Image plane—A two-dimensional representation of image data. The uppercase letters C, Y, M, K are used herein to indicate two-dimensional arrays of values representing a monochromatic image or a separable component of a polychromatic (multicolor) image. Two-dimensional arrays of values may also be referred to as "planes." For example, the Y plane refers to a two-dimensional array of values that represent the yellow component at every location (pixel) of an image.

Imaging Device—A device capable of generating, capturing, rendering, or displaying an image; including devices that store, transmit, and process image data. A color imaging device has the capability to utilize color attribute information.

Lightness—The perceptual response to luminance; denoted L* and is defined by the CIE as a modified cube root of luminance.

Primary Colors—Colors, usually three, which are combinable to produce a range of other colors within a color mixing model. All non-primary colors are mixtures of two or more primary colors. Red, green, and blue (R, G, B) are the standard additive primary colors. Cyan, magenta, and yellow (C,M,Y,K) are the standard subtractive primary colors. Black (K) colorant absorbs light energy substantially uniformly over the full extent of the visible spectrum and may be added to enhance color and contrast and to improve certain printing characteristics. Cyan, magenta, and yellow are the subtractive complements of red, green, and blue, respectively and they absorb the light energy in the long, middle, and short wavelength regions, respectively, of the visible spectrum, leaving other regions of the visible spectrum unchanged. Ideally, the absorption bands of individual CMY colorants are non-overlapping and completely cover the visible region of the spectrum. Actual CMY colorants do not satisfy these block-dye assumptions; instead, their absorption spectra are smooth and include some unwanted absorptions in their transmission bands. The reflectance spectra for white paper and cyan, magenta, yellow, and black colorants (100%) from a dye-sublimation printer are shown in FIG. 1. Red, green, and blue are the additive complements of cyan, magenta, and yellow respectively.

Security document—a paper or document having a value such as to render it vulnerable to counterfeiting or unauthorized copying attempts.

Subtractive Color Model—The production of color wherein light is subtracted through a process such as absorption; a color model in which colors may be produced by combining various percentages of the subtractive primaries (cyan, magenta, and yellow).

Introduction to a General Theory of the Invention

Two predominant modes for producing color are: Additive color, whereby color is produced by the addition of spectrally selective lights to a dark background that is otherwise substantially devoid of light; and subtractive color, whereby color is produced by spectrally selective subtraction of light energy from the light emitted by a source. Red, green and blue lights are typically used as the primaries that are mixed together in an additive system. In a subtractive system, colorants are typically used as the subtractive primaries. These colorants selectively absorb, or subtract, a portion of the visible spectrum of incident light while transmitting the remainder. Cyan, magenta, and yellow colorants are typically used.

Color in printed images results from the combination of a limited set of colorants deposited on a substrate over a small area in densities selected to integrate the desired color response. This is accomplished in many printing devices by reproducing so called "separations" of the image, where each separation provides varying gray values of a single primary color. When the separations are combined together, the result is a full color image.

Colorants that are deposited on a reflective substrate, such as a paper sheet, will selectively transmit incident light in a first pass to the surface of the substrate whereupon the transmitted light is then reflected by the substrate and is again filtered by the colorants in a second pass, thus encountering additional selective absorption before being perceptible as a particular color by an observer. It is also common for colorants to possess a degree of scattering, and the color appearance of a colorant on a printed substrate is determined by the amount and types of the colorants present, and the combination of their absorption and scattering properties.

In the practice of the invention, most colors in a subtractive color setting may be reproduced in an image by use of different proportions of cyan, magenta, and yellow colorants. Each of these colorants is spectrally characterized primarily by its absorption characteristics. An idealized cyan colorant, for instance, may be defined as having absorption band covering the wavelength interval 600–700 nm, commonly referred to as the red region of the spectrum. Likewise, an idealized magenta colorant has an absorption band covering the interval 500–600 nm, commonly referred to as the green region of the spectrum, and an idealized yellow colorant has an absorption band covering the interval 400–500 nm, commonly referred to as the blue region of the spectrum.

Thus, cyan, magenta, and yellow colorants absorb red, green and blue light, respectively. The idealized absorption bands for the cyan, magenta, and yellow colorants are referred to as the block-dye assumption. In reality, colorants interact and exhibit significant deviations from this idealized behavior, including variations of absorption within the absorption band, extension of the absorption band beyond the idealized limits, and scattering in the colorants. In particular, the absorption of light in a spectral region outside the main absorption band of a colorant (as, for example, demonstrated by absorption in the blue and red regions of the spectrum by a magenta colorant), is considered unwanted absorption. Among typical colorants used for CMYK printing, magenta demonstrates the most unwanted absorptions and yellow the least. A black colorant absorbs uniformly through the visible region of the spectrum and can be used as a replacement for combined cyan, magenta, and yellow colorant depositions for reasons of economy and improved rendition of dark regions.

Thus, according to the subtractive principle, a surface layer of a substrate such as a sheet of white paper, on which one can vary the concentrations of a cyan, a magenta, and a yellow colorant, thereby offers the means of varying the intensities of the reddish, greenish, and bluish parts of the white light reflected from the paper. To produce a subtractive color image reproduction, one can control the concentrations of the three colorants independently at localized areas on the paper substrate.

The present invention accordingly exploits the interaction between colorants (especially the colorants typically used for printing), and the manner in which an electronic image capture device senses a source image present in a composite image when the composite image is illuminated with one or more illuminants each of which having a known spectral power distribution. The methodology described herein may be generalized to apply to an arbitrary number of illuminants and colorants, and for the purpose of simplicity the invention is described with reference to the cyan, magenta, yellow, and black colorants commonly used in color printing applications, and to the narrow-band red, green, and blue illuminants commonly generated by light sources in an image capture device such as a color scanner. This description thus makes reference to the handling of monochromatic and color source images encoded according to an array of colorants such as the CMYK color primaries. However, it will be apparent to one of ordinary skill in the art that there are alternative multi-spectral uses for the invention. An alternative use of the invention would include a color system that employs primary colorants other than CMYK for color representations, such as systems that use RGB primaries or high-fidelity colorants such as orange and green. Still another alternative would be to employ the invention in a system that processes different types of multi-spectral data, such as source images encoded with respect to narrow band colorants responsive to illuminants generated from ultraviolet or infrared light sources.

As the present invention is directed to the multiplexing or demultiplexing of at least one source image encoded in a composite image, the composite image may be defined in a spectrally multiplexed (SM) image plane. This plane may have any number of different patterns of pixels, with a primary characteristic being that the plane is spectrally multiplexed. In general, at each location in the SM plane, a pixel value representing one or more spectral components may be present, and which spectral component is present depends on the gray level of the corresponding pixel in one of the source image planes. (The invention may also have applications to SM planes in which each pixel includes color values representative of color separation image data from more than one source image plane.)

The general theory of the invention may be understood with reference to: a composite image rendering device in the form of a color hardcopy output device, such as a color printer; an image capture device, such as a color scanner; and to mathematical determinations that will now be described.

Consider a color hardcopy output device that employs M colorants. The output spectral reflectance produced when the control values $\{A_j\}_{j=1}^{M}$ used for each of the M colorants is given by:

$r(\lambda; A_1, A_2, \ldots A_M)$=reflectance of region with colorant control values $A_1, A_2, \ldots A_M$ at wavelength $\lambda$ In the following description, we assume that a control value of 0 for a given colorant represents no printing of that colorant. This convention is not a requirement for the invention and is only adopted for notational simplicity.

If a rendered composite image from this device is captured with a N different image capture sensor devices with sensitivities as a function of wavelength $\lambda$ given by $\{V_i(\lambda)\}_{i=1}^{N}$ the responses of these devices to a printed region with colorant control values $\{A_j\}_{j=1}^{M}$ is given by:

$f_i(A_1, A_2, \ldots A_M)$=response of i-th capture device to a region with colorant control values $A_1, A_2, \ldots A_M$ $$A_1, A_2, \ldots A_M = \int_\lambda V_i(\lambda) r(\lambda; A_1, A_2, \ldots A_M) d\lambda \quad i = 1, 2 \ldots N$$

This set of N functions characterizes the relation between the control values $\{A_j\}_{j=1}^{M}$ used for each of the M colorants at a given pixel location and the response produced at the given pixel location by each of the N devices. A linear response from the image capture sensor devices has been assumed in the example above for illustration purposes only and is not required in order to practice the invention. It is also understood that the characterization of the image capture device in this description may include mathematical combination/manipulation of multiple image capture sensors, or channels.

With the notation and terminology defined above, the general multiplexed imaging problem reduces to the following mathematical problem.

Given N values $\{Y_i\}_{i=1}^{N}$ corresponding to the desired response values from the N image capture sensor devices, determine a set of control values for the M colorants $\{B^j\}_{j=1}^{M}$ to be used in rendering each pixel in a rendered composite image, such that for all i=1, 2, ... N:

$f_i(B_1, B_2, \ldots B_M)$=response of pixel under ith capture device is $Y_i$ \hfill (1)

Typically, for N>M (number of image specifications>number of colorants) the system is overdetermined and has a solution only under severe constraints on the $\{Y_i\}_{i=1}^{K}$ luminance values limiting its utility in illuminant multiplexed imaging. Even if N≦M (number of image specifications≦number of colorants), the system of N equations presented in (1) above has a solution (corresponding to realizable device control values $\{B_j\}_{j=1}^{M}$) only in a limited region of luminance values, which we refer to as the gamut for the spectrally multiplexed imaging problem:

G=gamut achievable for illuminant multiplexed imaging={$Y \in R^{+K}$ such that system (1) has a realizablesolution} \hfill (2)

where $Y=[Y_1, Y_2, \ldots Y_N]$ denotes the vector of response values under the N image capture sensor devices, and $R_+$ is the set of nonnegative real numbers. For specified N-tuples of response values within the gamut G, there is a set of realizable control values such that a pixel printed with the control values produces the required response values under the given illuminants. Vice versa, N-tuples of response values outside the gamut G cannot be created using any realizable control values. The situation is analogous to the limited color gamut encountered in typical color image reproduction.

It is generally useful to include a gamut mapping step in the spectral multiplexing described herein to ensure that the source images are limited to the gamut of the system before attempting to reproduce them. The gamut mapping may be image independent or image dependent, where the term image is used to imply the set of desired source images recoverable under the different illuminants. In addition, the set of images to be multiplexed may be designed to take into account the gamut limitations and produce the best results with those gamut limitations.

Once the source images to be multiplexed have been mapped to the achievable gamut G, the problem of composite image rendering reduces to the determination of the control values for each of the M colorants for each pixel in the rendered composite image. This corresponds to an inversion of the system of equations in (1); in performing a color calibration step, the inverse may be pre-computed and stored in N-dimensional look-up tables (LUTs), with one LUT one per colorant (or alternately, a single N-dimensional LUT with M outputs).

In practice, the function in (1) itself needs to be determined through measurements of the device response by printing a number of patches with different M-tuples of control values and measuring them suitably to obtain the luminance under the different illuminants. The full spectrum of the patches may be measured for instance on a spectrophotometer from which the spectral responses may be computed using the spectral sensitivities of the different image capture sensor devices. Alternately, a characterization target may be captured by the different image capture sensor devices to directly determine the function in (1) without a knowledge of the spectral sensitivities of the individual image capture sensor devices.

Simplification According to the One Image Capture Sensor Device/One Colorant Interaction Assumption Assume that the "spectral sensitivity band" of an image capture sensor device i refers to the region over which its spectral sensitivity is not negligible. Several simplifications can be incorporated into the general framework above. Suppose that N=M and the colorants and devices are such that colorant i absorbs only within the spectral sensitivity band of image capture sensor device i and is completely transparent in the spectral sensitivity bands of all other image capture sensor devices. This, for instance, represents a situation wherein each colorant has a narrow absorption band, outside of which the colorant is transparent, and the spectral sensitivity bands of the image capture sensor devices correspond to the same narrow absorption bands. In this case, $$f_i(A_1, A_2, \ldots A_M) \text{ function of } A_i \text{ alone}=f_i(0, 0, \ldots, 0, A_i, 0, \ldots 0) \equiv g_i(A_i) \; i=1,2, \ldots N \quad (3)$$

The system of equations in Eq. (1) then reduces to M independent nonlinear equations, one for each colorant operating with the corresponding image capture sensor device:

$$g_i(B_i)=Y_i, \text{ where } i=1,2, \ldots N \quad (4)$$

The achievable gamut can be defined as follows. As i=1, 2, ... N and let:

$$g_i^{min} = \min g_i(A_i)$$

$$g_i^{max} = \max g_i(A_i)$$

$h_i=[g_i^{min}, g_i^{max}]$=the interval of responses from $g_i^{min}$ to $g_i^{max}$ (5)

$G_1$ = achievable gamut under assumption of one illuminant interacting with only one colorant = $h_1 \times h_2 \ldots \times h_N$ In other words, the achievable gamut is the product set of these individual response intervals. Note that an assumption in Eq. (6) is that the complete interval between the max and min limits can be realized without any "gaps" which would typically be expected with physical colorants. (For a definition of a product set, see for instance, A. Friedman, *The Foundations of Modern Analysis*, Dover, 1982, New York, N.Y.)

Under the assumption of a single illuminant interacting with a single colorant, the multi-illuminant imaging characterization problem reduces significantly. Instead of requiring N-dimensional LUTs, only an array of one-dimensional LUTs (one per colorant) are needed. The value of each colorant may be determined by the response for the corresponding image capture sensor device alone.

Alternative Simplifications

In practice, the assumption of one illuminant interacting with only one colorant does not fully represent the typical colorant. However, if the strongest interactions are assumed to be between the Ah colorant and the ith image capture sensor device, with other interactions exhibiting a smaller magnitude of interaction, the achievable gamut is a reduced N-dimensional dimensional region that is contained in $G_1$. Note that the situation of using cyan, magenta, and yellow colorants with image capture sensor devices with narrow band red, green, and blue spectral sensitivities corresponds to this case, where the cyan interacts most with red, magenta with green, and yellow with blue. Note also that the use of a black colorant that (typically) absorbs all illuminants almost equally, does not satisfy the requirement of strong interaction with only one illuminant. In practice this implies that a black colorant should be viewed as an additional colorant, i.e., if one colorant is black:

$N$=number of illuminants=number of images $\leq$number of colorants$-1=M-1$

Black may, however, be used with other colorants in special situations (as is described in the examples below) and can help improve achievable gamut (i.e., improve dynamic range), simplify computation, and reduce cost.

Simplifications Based on Additive Density Models

The general technique described earlier requires a measurement of the device response in the M-dimensional input space of device control values, and the final characterization may be embodied in the form of multi-dimensional LUTs with N-dimensional inputs. In several cases, the measurement and storage/computation requirements herein can be significantly reduced by using simple models of the output processes. One useful model is to assume that the "response densities" follow an additive model, i.e., $$\{A_j\}_{j=1}^M \; d_i(A_1, A_2, \ldots A_M) \equiv -\log\left(\frac{f_i(A_1, A_2, \ldots A_M)}{f_i(0, 0, \ldots 0)}\right) \quad (7)$$

$$= -\sum_{j=1}^M \log\left(\frac{f_i(0, 0, \ldots, A_j, \ldots 0)}{f_i(0, 0, \ldots 0)}\right)$$

$$= -\sum_{j=1}^M d_i(A_j)$$

where: $d_i(A_j) \equiv -\log\left(\frac{f_i(0, 0, \ldots, A_j, \ldots 0)}{f_i(0, 0, \ldots 0)}\right)$ (8)

(Traditionally, densities are defined as logarithms to the base 10, any other base can also be used in practice as it changes the densities only by a scale factor and does not impact any of the other mathematical development.) Note as per our convention, the control values $\{0, 0, \ldots, 0\}$ represent an blank paper substrate and therefore $f_i(0, 0, \ldots 0)$ represents the response of the paper substrate under the ith image capture sensor device, and the logarithmic terms represent paper normalized response densities. The additive model for response densities is motivated by the Beer-Bouguer law for transparent colorant materials and the assumption of relatively narrow band spectral sensitivities for the image capture sensor devices, for which the additive nature of spectral density implies the approximation above is a valid one. The model also often provides a reasonable approximation for halftone media where the assumptions do not strictly hold. (For a more detailed background, see: F. Grum and C. J. Bartleson, Ed., *Optical Radiation Measurements: Color Measurement*, vol. 2, 1983, Academic Press, New York, N.Y. or G. Sharma and H. J. Trussell, "Digital Color Imaging", *IEEE Transactions on Image Processing*, vol. 6, No. 7, pp. 901–932, July 1997.) Full computations using a spectral density model might be performed if necessary to improve the model accuracy. This would be potentially advantageous in a situation where the image capture sensor device spectral characteristics (i.e., sensitivities) are not strictly narrow band.

The terms $$d_i(A_j) \equiv \log\left(\frac{f_i(0, 0, \ldots, A_j, \ldots 0)}{f_i(0, 0, \ldots 0)}\right)$$

represent the paper normalized response density of a patch printed with the jth colorant alone and no other colorants, with the control value for the jth colorant set as $A_j$. Therefore the additive density model proposed above allows the determination of the response density of any patch based on the visual density of control patches of individual colorants. This reduces significantly the number of measurements required. Measurements of "step-wedges" of the individual colorants (for which other colorants are not printed) allow one to determine the functions $d_i(A_j)$ i=1,2, ... N, j=1, 2, ... M, from which the complete device characterization function can be determined using Eq. (8).

Using the above model, the system of equations in Eq. (1) reduces to $$\sum_{j=1}^{M} d_i(B_j) = \log(Y_i/Y_i^0) \quad \text{where} \quad Y_i^0 = f_i(0, 0, \ldots 0) \tag{9}$$

The equations in Eq. (9) represent a system of K nonlinear equations in M variables $(B_1, B_2, \ldots B_M)$. The functions $d_i(A_j)$ are available from the measurements of the "step-wedges" and the above equations can be solved for the control values $B_j$ for luminance values within the gamut G, which was defined earlier. For points outside the gamut, the equations may be solved in an approximate sense providing a (less-controlled) form of gamut mapping.

Further simplification of these equations is possible by assuming that the densities in different spectral bands are linearly related, i.e., $$d_i(C) = \alpha_i^j d_j(C) \quad i=1,2, \ldots N \tag{10}$$

where $\alpha_i^j = d_i(C)/d_j(C)$ is the proportionality factor relating the visual density for the jth colorant under the ith illuminant to the visual density for the jth colorant under the jth image capture sensor device and is assumed to be independent of the colorant value C, and $\alpha_i^j=1$.

Thus the convention adopted in Eq. (10) is that the density of the jth colorant sensed by all other image capture sensor devices is referenced to its density with respect to the jth image capture sensor device itself, which is not strictly a requirement of our model but is chosen because it results in a simplification of the notation; alternate conventions could also be used. Equation (10) is also motivated by the Beer-Bouguer law for transparent colorant materials and the assumption of relatively narrow band illuminants. (For a more detailed background, refer to: F. Grum and C. J. Bartleson, Ed., *Optical Radiation Measurements: Color Measurement*, vol. 2, 1983, Academic Press, New York, N.Y. or G. Sharma and H. J. Trussell, "Digital Color Imaging", *IEEE Transactions on Image Processing*, vol. 6, No. 7, pp. 901–932, July 1997.) Even though a number of colorants and marking processes do not follow the Beer-Bouguer law exactly, in practice, Eq. (10) can provide a reasonably accurate empirical model for measured data and may be used for the purposes of the present invention. With the simplification of Eq. (10) the system of equations in Eq. (9) reduces to a linear system of equations:

$$\sum_{j=1}^{M} \alpha_i^j d_j(B_j) = \log(Y_i/Y_i^0) \quad i=1, 2, \ldots N \tag{11}$$

which can be written in matrix-vector notation as:

$$Ad = t \tag{12}$$

where A is the N×M matrix whose ij th element is $\alpha_i^j$, d is M×1 the vector whose jth component is $d_j(B_j)$ and t is the N×1 vector whose ith component is $\log(Y_i/Y_i^0)$.

The system of linear equations can be solved to determine a value of d, which provides the desired response values under the different illuminants (corresponding to the multiplexed images). The individual components of d, i.e., the $d_j(B_j)$ values can then be used with the density response for the jth colorant under the jth image capture sensor device to determine the control value corresponding to the jth colorant, i.e., $B_j$. This process is analogous to inverting a 1-D TRC. Repeating the process for each colorant provides the complete set of colorant control values required $\{B_j\}_{j=1}^{M}$ that produce the desired set of response values under the different image capture sensor devices.

Note that if N=M, the above set of equations has a unique solution, if A is invertable, which is normally the case for typical colorants and image capture sensor devices. The solution in this case is obtained simply by inverting the matrix A. Furthermore, if the colorants and image capture sensor devices can be ordered in correspondence, i.e., colorant i primarily influences the response of illuminant i and the other image capture sensor devices to a lesser extent, then $\alpha_i^j \leq \alpha_i^i = 1$, for all i=1,2 ... N, i.e., the matrix A is square with the elements along the diagonal as the largest along each row, which is often desirable from a numerical stability standpoint. If M>N the system of equations will have multiple mathematical solutions, and the choice of a particular solution may be governed by additional criteria. One example of a criterion for choosing among the multiple mathematical solutions is feasibility, wherein a feasible solution is deemed a set of density values that can be realized with the range of available colorant control values.

The model inherent in Eq. (12) can also be used to determine suitable approximations to the achievable gamut G and can be of assistance in performing gamut mapping. Typically, the density curves $d_j$ (C) are monotonically increasing functions of the colorant control value C and the achievable range of densities for the jth colorant under the jth image capture sensor device is between $d_j^{min} = d_j(0) = 0$ and $d_j^{max} = d_j(C_j^{max})$, where $C_j^{max}$ is the maximum control value for the jth colorant. The achievable gamut, assuming that the model of Eq. (12) is valid, is:

$G_D$=achievable response gamut under assumption of additive densities={y such that there exists a d with Ad=log(y/y$^0$) and 0=d$^{min}$≤d≤d$^{max}$} (13)

where $d^{min}$ is an M×1 vector whose jth component is $d_j^{min} = 0$, and $d^{max}$ is an M×1 vector whose jth component is $d_j^{max}$, y is an N×1 vector whose ith component represents the response under the ith image capture sensor device, and $y^0$ is a N×1 vector whose ith component represents the paper response under the ith image capture sensor device. The inequalities, the division, and the logarithm in the right hand side of Eq. (13) are understood to be applicable on a term-by-term basis for the vectors.

The N images to be produced under the N illuminants provide a N-tuple for each pixel location corresponding to the desired response values at that pixel location under the N image capture sensor devices. The N-tuples corresponding to all the pixel locations must lie within the gamut G (defined earlier) in order for the image to be producible using the given colorants and image capture sensor devices. If the images to be encoded for multiplexing do not satisfy this constraint some form of gamut mapping is necessary.

A simple image-independent gamut mapping scheme may be defined as follows. First, the ranges of response values under the different illuminants are determined such that all possible values within these ranges lie within the gamut G. This is mathematically equivalent to stating that we determine a set of N-intervals $S_i=[Y_i^{min}, Y_i^{max}]$, i=1,2,... N such that the product set of these intervals is contained within the gamut G, i.e., $$S_1 \times S_2 \times S_3 \times \ldots \times S_N \subseteq G \qquad (14)$$

The gamut mapping may then be performed on an image-independent basis by mapping the set of requested response values under the ith image capture sensor device to the interval $S_i=[Y_i^{min}, Y_i^{max}]$ by some function (typically, a monotonous function). The interval $S_i$ determines the response dynamic range achieved under the ith image capture sensor device. Since there are typically multiple choices of the sets $\{S_i\}_{i=1}^N$ for which Eq. (14) is valid, one method for selecting the intervals may be by using a max-min optimization, wherein one may maximize the minimum dynamic range achievable.

Mathematically, this approach can be described as follows: Select the sets $\{S_i\}_{i=1}^N$ such that $\min_i f(S_i)$ is maximized, wherein $f(S_i)$ is some suitably chosen function that measures the contrast achieved corresponding to the luminance range $S_i$. Examples of suitable choices of the function $f(\ )$ are a simple response ratio i.e., $f(S_i)=Y_i^{max}/Y_i^{min}$, or density range $f(S_i)=\log(Y_i^{max}/Y_i^{min})$. Note that the choice of the density range as the function in the max-min optimization along with the model of Eq.(13) reduces this to a linear max-min optimization problem with box constraints that can be solved using numerical optimization schemes.

Illustrated Embodiments of the Invention

For a general understanding of the present invention, reference is made to the drawings. In the drawings, like reference numerals have been used throughout to designate identical elements.

Figure 3:
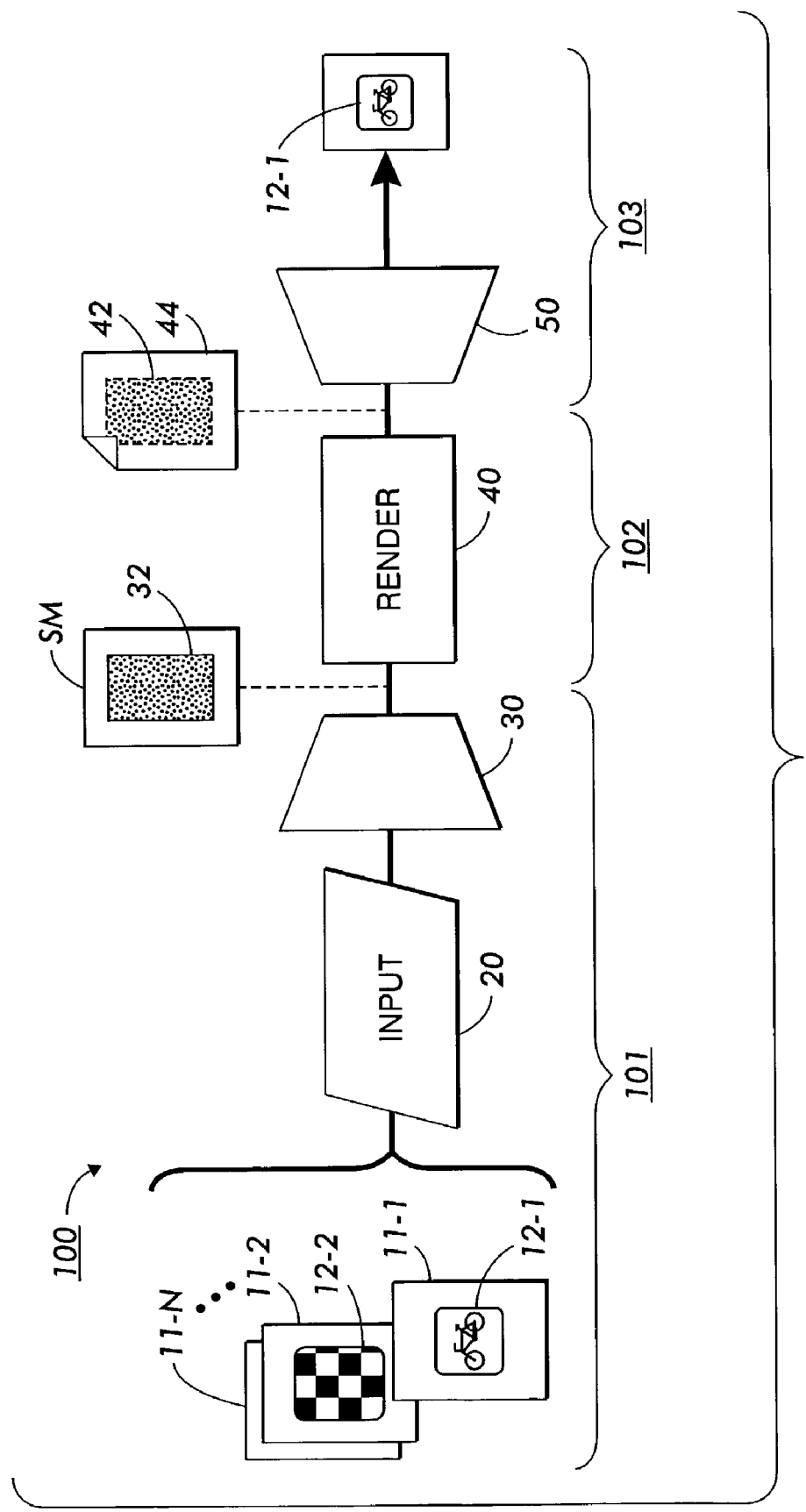
FIG. 3 is a block diagram of systems for spectral multiplexing and demultiplexing of plural source images, and for rendering a composite image having therein at least one encoded source image, constructed according to the invention.

FIG. 3 illustrates a system 100 operable in a first mode for spectrally multiplexing a plurality of source images to form a composite image, in a second mode for rendering the composite image, or in a third mode for demultiplexing the spectrally multiplexed composite image so as to recover at least one of the plurality of source images.

As shown in FIG. 3, a plurality of disparate source image arrays 11-1, 11-2, ... 11-N are presented to an image input device 20 in a spectral multiplexing system 101. Image input device 20 may be equipped to receive plural monochromatic source images or a combination of monochromatic and multichromatic source images. Image input device 20 may include an image capture device such as a digital scanner coupled to a random access memory, or any type of analog or digital camera coupled to a storage means such as a computer memory or a magnetic or optical recording medium. Image input device 20 may also include means for receiving a source image that had previously been stored in a random access memory, on video tape, or a laser-encoded disk, etc., or for receiving a source image created by a computer image generator, or a source image encoded in an appropriate format and transmitted on a network.

The illustrative representation of the plural source images in respective image arrays received by the image input device 20 in this example includes a first source image 12-1 represented in a first source image array 11-1 and a second source image 12-2 represented in a second source image array 11-2. The system 101 can optionally receive N source images which are represented in a respective number of image arrays. In this exemplary embodiment of the invention, disparate pictorial source images are employed and at least one of the plural source images is intended for ultimate recovery (via spectral demultiplexing) from a rendered composite image, the latter which will be described shortly.

Once the source image data is received in the input image device 20, it is presented to a spectral multiplexer 30, which encodes a data representation of a composite of at least the first and second source images, so as to provide a composite image 32 on an spectrally multiplexed (SM) image plane. Such encoding may proceed in one embodiment with mapping for every pixel location, or by mapping in localized areas rather than specific pixels, to the composite image 32, so as to multiplex the information necessary for encoding of each corresponding pixel located in each source image.

Next, according to operation of a composite image rendering system 102, data representative of the composite image is provided to a rendering device 40, which can be connected to the spectral multiplexer 30 by any one of a variety of suitable means for transmitting or storing electronic information. The rendering device 40 records the composite image 32 on a substrate 44 with use of a predetermined array of colorants, so as to form a rendered composite image 42. The rendered composite image 42 is thereby fixed on the substrate 44.

The rendered composite image 42 is available for scanning by a demultiplexer 50. Although the rendered composite image 42 is representative of data encoded in the spectrally multiplexed plane using the method of the invention, the rendered composite image 42 may exhibit a confused appearance under conventional ambient lighting conditions. In particular, at least one of the source images 12-1, 12-2, etc. is made difficult or impossible to distinguish under conventional ambient lighting conditions. A particular source image may thereby be embedded and made difficult or impossible to distinguish until a demultiplexer 50 is operated to selectively process the composite image 42 in a manner sufficient to recover the embedded source image.

According to operation of a spectral demultiplexing system 103, the particular source image (as shown in FIG. 3, source image 12-1) may be recovered from the composite image 42. In the embodiment illustrated in FIG. 3, the output of the demultiplexer 50 is a data signal representative of the recovered source image 12-1 using the method of the invention. The recovered image source image data signal may be provided to conventional apparatus (not shown) for a variety of uses including, for example, simple detection of the presence or absence of the recovered source image, with subsequent interpretation of such significance; or for comparison to a standard for authentication, wherein the recovered image data is compared, for example, to a stored version of the original source image 12-1 that was initially provided to the image input device 20.

Recovery of a particular source image will be understood to generally proceed according to an exemplary embodiment of the spectral demultiplexing system 103 as follows. The substrate 44 is positioned with respect to an illuminant source operable within the demultiplexer 50, such that one or more illuminants generated by the demultiplexer 50 illuminate the composite image 42 so as to subject the array of colorants in the rendered composite image 42 to the selected illuminant. As a result of the rendered composite image 42 thus being controllably and selectively illuminated by at least one illuminant, a desired source image is then detected by the demultiplexer 50. Output of the sensor data representative of the desired source image 12-1, now recovered, is thereby available for further uses.

Figure 4:
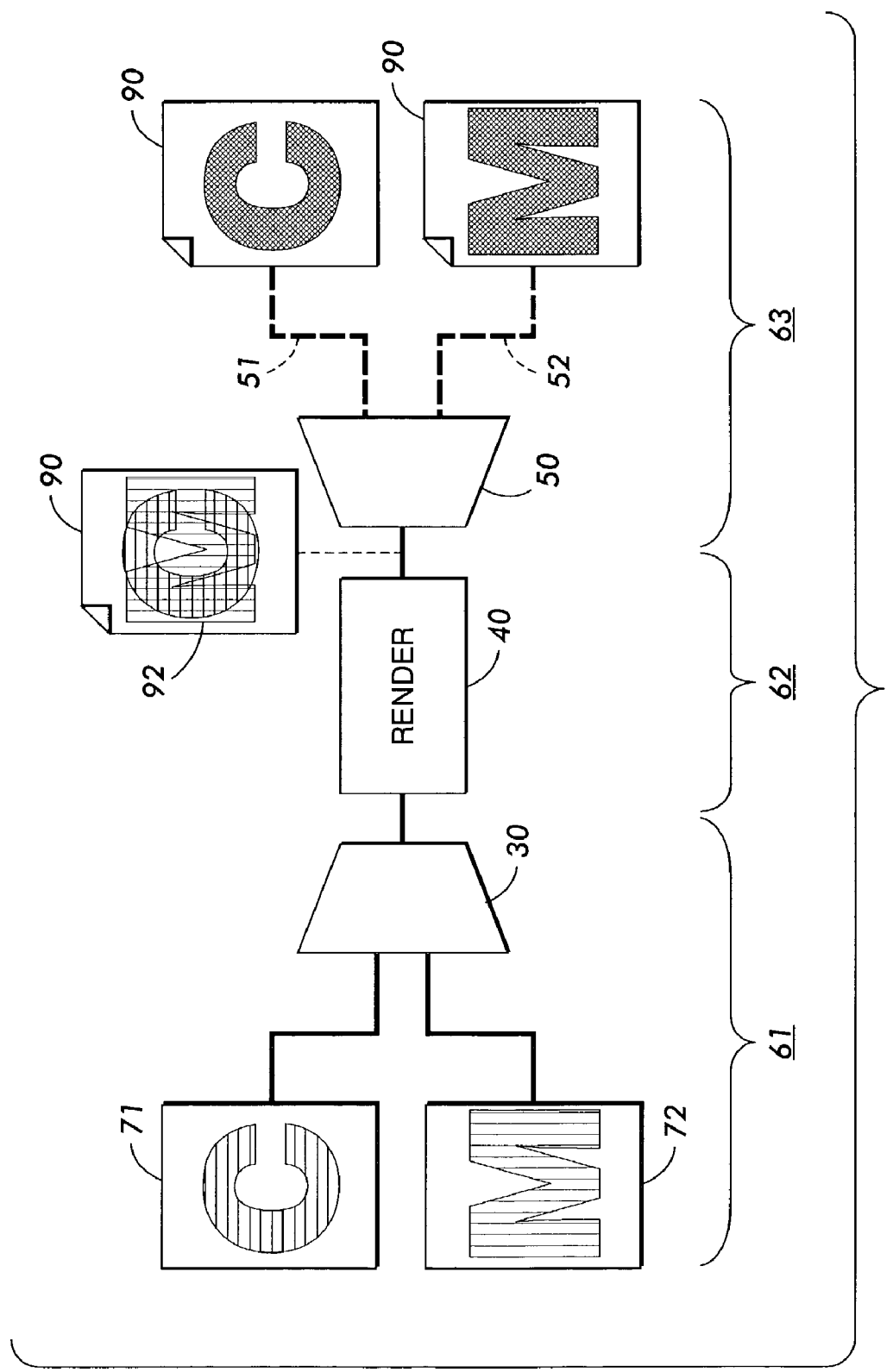
FIG. 4 is a simplified schematic diagram of methods operable in the system of FIG. 3 for spectrally multiplexing first and second source images in a composite image, rendering the composite image with use of respective first and second colorants, and for demultiplexing the rendered composite image.

FIG. 4 is a simplified schematic diagram of exemplary embodiments of spectral multiplexing, rendering, and spectral demultiplexing steps 61, 62, 63, respectively. In step 61 for multiplexing plural source images, a first source image 71 and a second source image 72 are provided to the multiplexer 30, which outputs a composite image data file to a rendering device 40. The output of the rendering device 40 is substrate 90 which has incorporated therein a composite image 92. The original source image 71 is rendered as a pattern using a first colorant; in the illustrated embodiment, a cyan ink or toner is chosen. The second source image 72 is rendered as a pattern using a second colorant; in the illustrated embodiment, a magenta ink or toner is chosen. (As there is typically some overlap in absorption bands between practical narrow band colorants, the two source images are encoded in step 61 to account for the absorption that will occur when plural colorants are utilized to produce the composite image.)

In a rendering step 62, the composite image specifies patterns in cyan and magenta colorants that are rendered on a substrate 90 to form the rendered composite image 92. Those skilled in the art will appreciate that certain portions of the two patterns may be co-located and other portions are relatively spatially distinct. Nonetheless, in preferred embodiments of the present invention, visual recognition of at least one of the source images from the composite image is made difficult or impossible due to the confusion between the source images that are present in the rendered composite image 92.

In step 63 for demultiplexing the rendered composite image 92, the substrate 90, having the rendered composite image 92 fixed thereon, is illuminated by the demultiplexer 50. Controlled illumination of the substrate 90 according to a first mode 51 of illumination causes the first source image 71 to exhibit a particular level of density with respect to the remainder of the composite image and thus the first source image 71 becomes detectable on the substrate 90. Alternatively, controlled illumination of the substrate 90 according to a second mode 52 of illumination causes the second source image 72 to be similarly detectable on the substrate 90. In the illustrated embodiments, the first source image 71 and the second source image 72 are therefore selectably recoverable from the rendered composite image 92.

Figure 5:
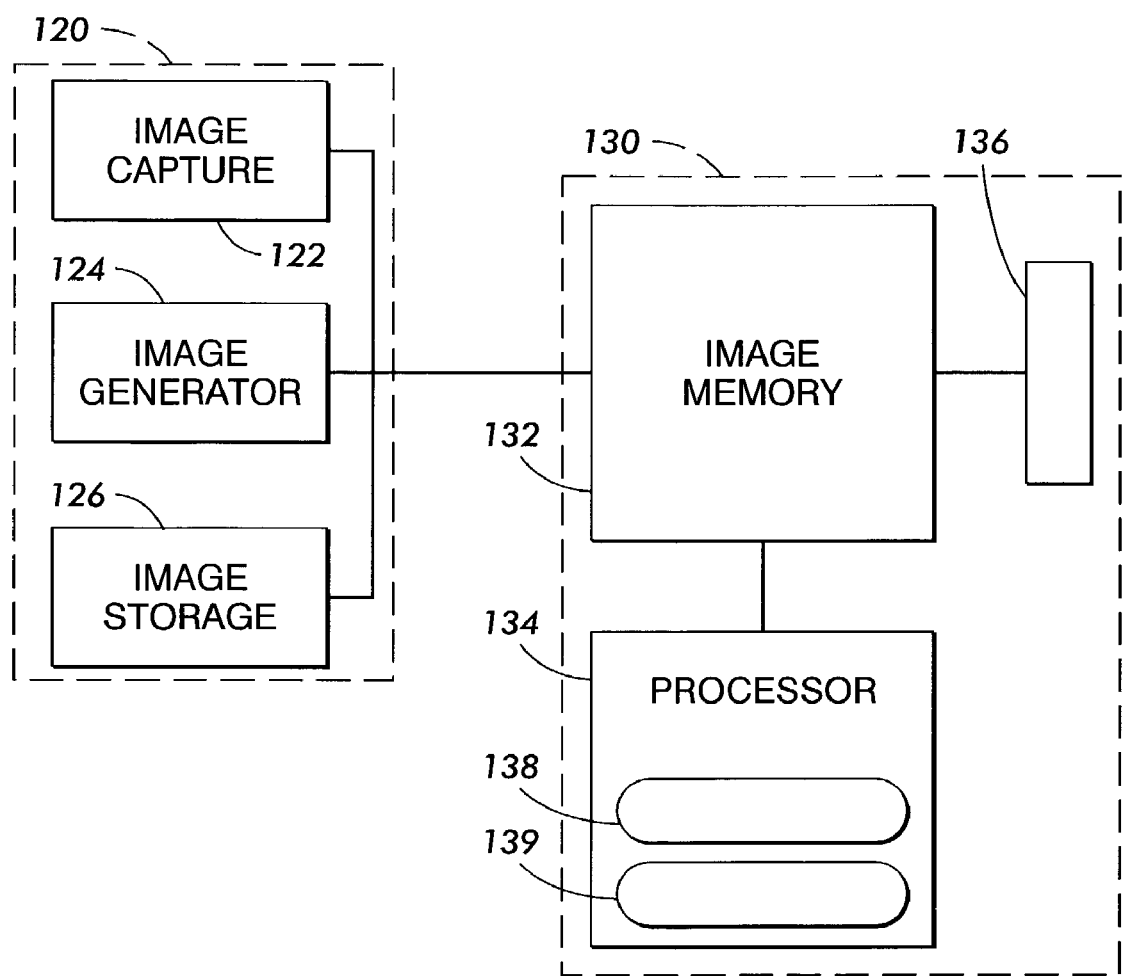
FIG. 5 is a schematic simplified representation of the spectral multiplexing system of FIG. 3, in which an image processing unit and associated peripheral devices and subsystems are employed.

FIG. 5 illustrates a schematic simplified representation of the spectral multiplexing system 101 of FIG. 3, in which an image processing unit 130 and associated peripheral devices and subsystems are employed. An image input terminal 120 may include an image input capture device 122 such as a scanner, digital camera, or image sensor array; a computer image generator 124 or similar device that converts 2-D data to an image; or an image storage device 126 such as a semiconductor memory or a magnetic, optical, or magneto-optical data storage device. The image input terminal 120 derives or delivers digital image data in the form of, for example, plural monochromatic image files, wherein the picture elements or "pixels" of each image are defined at some gray value. For example, the input terminal 120 may be employed to derive an electronic representation of, for example a document or photograph from image capture device 122, in a format related to the physical characteristics of the device, and commonly with pixels defined at m bits per pixel. If a color document, the image is defined with two or more separation bitmaps, usually with identical resolution and pixel depth. Image data from the input terminal 120 is directed to an image processing unit (IPU) 130 for processing so as to be encoded to create a composite image. It will be recognized that the data representing one or more source images is spectrally encoded by the image processing unit 130 to provide secondary image data representative of a composite image suitable for subsequent rendering.

The image processing unit 130 may include image memory 132 which receives input image data from image input terminal 120 or from another suitable image data source, such as an appropriately programmed general purpose computer (not shown) and stores the input image data in suitable devices such as random access memory (RAM). Image processing unit 130 commonly includes processor 134. The input image data may be processed via a processor 134 to provide image data representative of plural source images defined on respective source image planes in accordance with the present invention. For example, image data signals in the form of RGB or black and white (B/W) images may be processed, and the luminance information derived therefrom may be used to provide data representative of a source image. Image data signals presented in other formats are similarly processed: image data signals in, for example the L*a*b format, may be processed to obtain data representing a source image from the lightness channel. Image data signals that are already formatted in grayscale are generally usable without further processing.

Operation of the image processing unit 130 may proceed according to one or more image processing functions 138, 139 so as to encode the source image data into the composite image file as described herein. Processing may include a color conversion which, if necessary, may be implemented to convert a three-component-color description to the printer-specific four-component-color (or higher) description, and may include a halftoner which converts a c bit digital image signals to d bit digital image signals, suitable for driving a particular printer, where c and d are integer values. In certain embodiments, additional functions may include one or more functions such as color space transformation, color correction, gamut mapping, and under color removal (UCR)/gray component replacement (GCR). Control signals and composite image output data are provided to an interface 136 for output from the image processing unit 130.

The image processing unit 130 may be embodied as an embedded processor, or as part of a general purpose computer. It may include special purpose hardware such as for accomplishing digital signal processing, or merely represent appropriate programs running on a general purpose computer. It may also represent one or more special purpose programs running on a remote computer.

Figure 6:
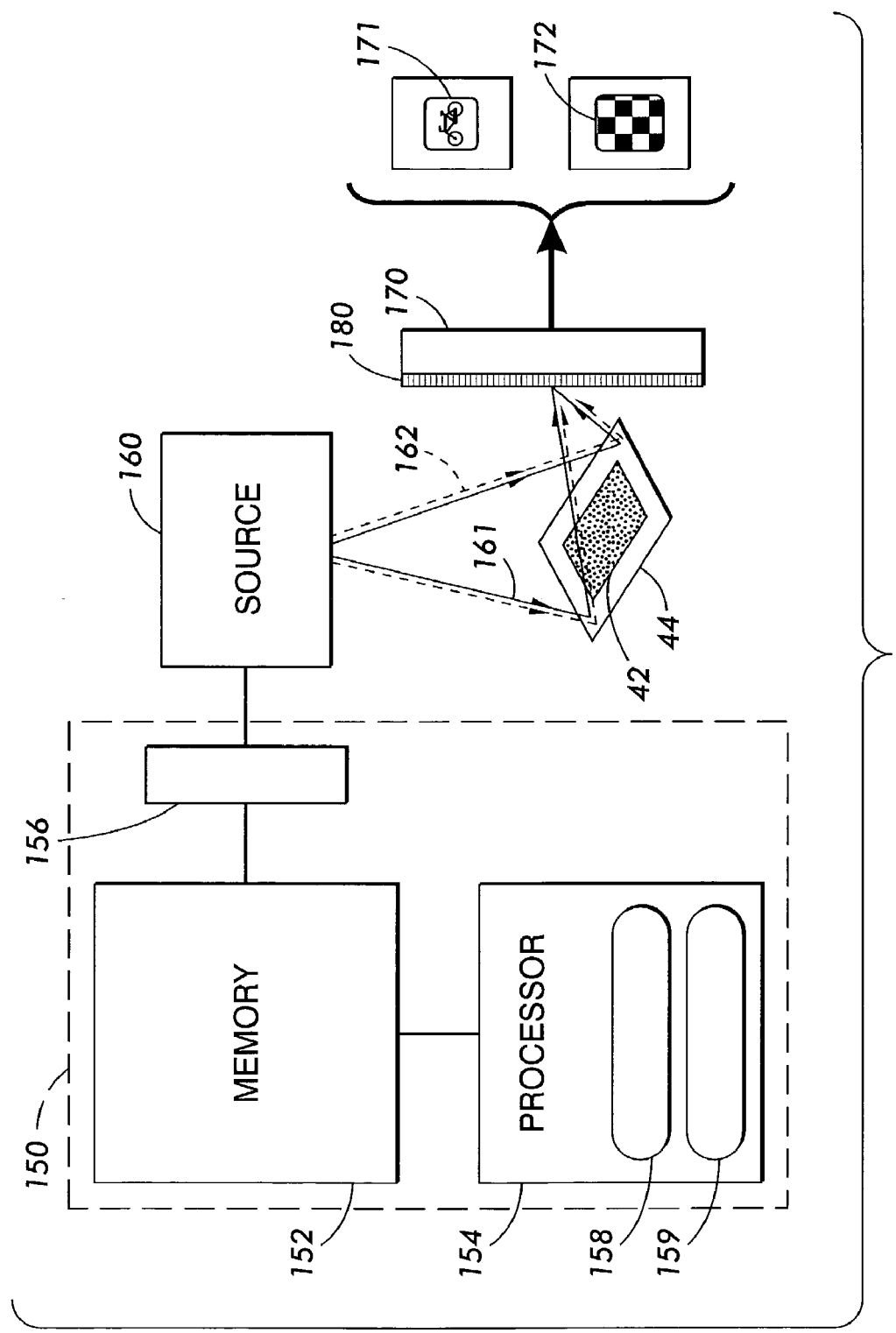
FIG. 6 is a simplified schematic representation of the spectral demultiplexing system of FIG. 3, in which an image capture device and associated peripheral devices and subsystems are employed.

FIG. 6 is a simplified schematic representation of the spectral demultiplexing system 103 of FIG. 3, in which a controller and associated peripheral devices and subsystems are employed to recover one or more recovered source images 171, 172. FIG. 6 shows a controller 150 connected to a illuminant source 160 that is operable for subjecting the composite image 42 on substrate 44 to first and second predefined illuminants 161, 162. Firstly, as illustrated with reference to the rendered composite image 42 on substrate 44, under conventional ambient lighting and in the absence of an illuminant 161, 162, only the rendered composite image 42 is distinguishable and the desired source image is undetected. However, upon activation of the source 160 so as to provide the first predefined illuminant 161, the source image 171 is detected by a detector 170 having an array 180 of sensor devices. Alternatively, the mode of operation of the source 160 may be switched so as to provide a second predefined illuminant 162, whereupon the rendered composite image 42 is instead subjected to the second illuminant 162, and the source image 172 is detected.

In its simplest form, the controller 150 may be constructed as a manually-operable illuminant selector switch. Alternatively, as illustrated, the controller 150 may be provided in the form of a computer-based control device having an interface 156 connected to an image capture device such as a color scanner, having source 160 and detector 170 integrated therein, which offers programmable control of the operation of the illuminant source 160 and detector 170. The controller 150 may thus be operated to cause selective activation and deactivation of the illuminant source 160 so as to provide one or more selected fields of illumination 162.

The controller 150 is operable for accomplishing tasks such as activation, deactivation, or sequencing of the illuminant source 160, and for selecting illuminant intensity, spectral power distribution, frequency, etc. Embodiments of the controller 150 benefit from operation of a programmable control system comprising standard memory 152 and processor 154.

In another embodiment, the controller 150 may be employed, for example, for supplying uniform R or G or B screen images to the interface 156 for subsequent display on the illuminant source 160 when the latter is constructed in the form of a CRT monitor.

Operation of the illuminant source 160 by the controller 150 may proceed according to certain sequenced control functions so as to provide, for example, controlled operation of the illuminant source 160 to afford a field of illumination that varies according to selective characteristics such as a sequential activation and deactivation of selected narrow band illuminants, or of controlled operation of the intensity of same; or with interactive control according to intervention by an operator of the particular sequence, intensity, or duration of the illuminants. As noted above, the rendered composite image may be constructed to have a plurality of source images encoded therein; for example, of at least first and second patterns of respective first and second colorants. The rendered composite image may be subjected to a temporal sequencing of illumination by respective first and second narrow band illuminants, thus allowing a respective one of the first and second recovered source images 171, 172 to be sequentially distinguishable.

The present invention relates to the digital imaging arts. It finds particular application in conjunction with embedding at least one digital source image, such as a digitized logo, within another digital image, to produce a composite image, and has been described with particular reference thereto. However, it should be appreciated that the present invention may also find application in conjunction with other types of digital imaging systems and applications where embedding hidden information in a rendered composite image is desirable.

It will no doubt be appreciated that the encoding of source images to provide the composite image may be accomplished according to the teachings herein with use of either software, hardware, or combination software-hardware implementations.

Note that one skilled in the art may realize a variety of alternatives are within the scope of this invention for implementing the above described embodiments. Its advantageous use is expected in color printing by various processes including offset lithography, letterpress, gravure, xerography, photography, and any other color reproduction process which uses a defined number of colorants, usually three or four, in various mixtures. Embodiments of the rendering system 102 include apparatus capable of activating, depositing, or integrating a defined array of colorants in a substrate, according to the composite image, such that the array of colorants is susceptible to selective reflection or transmission in an imagewise fashion when subject to a selected illuminant incident thereon. For example, the composite image may be rendered on a transparent film and a desired source image may be recovered when the substrate is backlit by a suitable illuminant. Examples include hardcopy reprographic devices such as inkjet, dye sublimation, and xerographic printers, lithographic printing systems, silk-screening systems, and photographic printing apparatus; systems for imagewise deposition of discrete quantities of a color on a substrate surface, such as paint, chemical, and film deposition systems; and systems for integration of colorant materials in an exposed surface of a substrate, such as textile printing systems.

Embodiments of exemplary substrates include, but are not limited to, materials such as paper, cardboard, and other pulp-based and printed packaging products, glass; plastic; laminated or fibrous compositions; and textiles. Narrow band colorants other than basic CMYK colorants may be used in the practice of this invention.

The field of illumination for illuminating a rendered composite image may be provided by a variety of illuminant sources that include wide band and narrow band light sources responsive to manual control or to programmed control according to an illuminant source control signal. Various narrow band light sources may include apparatus for providing filtered sunlight, filtered incandescent, or filtered fluorescent light; coherent light sources such as a solid-state laser or laser diode; projection or image display devices such as those incorporating a cathode ray tube (CRT), flat-panel display (FPD), liquid crystal display (LCD), plasma display, or light emitting diode (LED) and organic light emitting (OLED) arrays. Light sources incorporating a cathode ray tube are advantageous in that they have phosphors that exhibit stable and well-understood spectral characteristics that are sufficiently narrow and complementary to common CMY colorants. In addition, such displays are widely available.

Additional familiar components (not shown) may be included such as a keyboard, and a mouse, means for reading data storage media, a speaker for providing aural cues and other information to the observer, and adapters for connection of the systems described herein to a network medium. Computer readable media such as memory, hard disks, CD-ROMs, flash memory, and the like may be used to store a computer program including computer code that implements the control sequences pertinent to present invention. Other systems suitable for use with the present invention may include additional or fewer subsystems.

Embodiments of the invention are contemplated for implementing secure verification of authenticity of an item bearing the rendered composite image, or of information content borne by the item, such as for authentication of a document, certificate, form of currency, or other such valuable instrument. Such embedded information may be present in the form of an indice or an image useful for determination of source or provenance, validation, identification, or the like. For example, the appearance of a properly recovered source image on an item scanned under specific, controlled illumination can be used to confirm the authenticity of the scanned item. Fraudulent attempts to circumvent the authentication process, such as by proffering a photocopy or other counterfeit facsimile of the item, produced without the printer calibration settings necessary for generating an authentic rendered composite image, will not enable the recovery of a proper source image from the scanned facsimile, and the counterfeit item would thus be discovered and a rejection, alarm signal, or other condition would occur.

Embodiments of the invention are contemplated for the encoding and recovery of embedded source images in documents, coupons, game pieces, tickets, certificates, commercial paper, currency, identification cards, and the like.

Embodiments of the invention are contemplated for authentication of the information content in a product provided to a user, wherein the product has the rendered composite image integrated within, or attached thereto. In particular, the inclusion of a rendered composite image is contemplated for documents, books, works of art, and novelty items, and for software, multimedia, and audio-visual works. Rendered composite images made using this invention can be distributed to users for subsequent demultiplexing when exposed to a field of illumination generated by, for example, an illuminant source driven by a controller according to instructions directed to the controller from a remote source, such as from an internet site, or according to instructions from a software application, electronic mail message, Internet web page, or similar source.

Embodiments of the invention may be employed for detecting, identifying, or authenticating a particular source or category of information content, such as in printed messages, news, or advertising; or for indicia, such as trademarks, on objects; or of copyrights on artworks and the like. Embodiments of the invention are contemplated for use in the fields of publishing, merchandising, and advertising, and for items such as labels, price tags, boxes, bottles, containers, wrappers, or other packaging or shipping materials.

Embodiments of the invention may be employed with respect to rendered composite images located on textiles and garments, and in other wearable or personal items such as footwear, timepieces, eyewear, jewelry, appliques, fashion accessories, and the like. Items bearing composite images generated in the course of the practice of this invention may have an artistic, novelty, or collectible nature.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of processing a plurality of source images, comprising the steps of:
   encoding the plurality of source images to thereby provide a composite image suitable for rendering as a rendered composite image, the encoding including mapping of source image values at pixel locations in the source images to colorant control values $$\{A_j\}_{j=1}^{M}$$

at respective pixel locations in a spectrally-multiplexed image plane, whereby the colorant control values specify an amount of each one of a plurality of colorants to be deposited at corresponding locations in the rendered composite image, and the rendered composite image being suited for image capture by a detector having a plurality of N sensors having respective sensitivities as a function of wavelength $\lambda$ given by $$\{V_i(\lambda)\}_{i=1}^{N},$$

rendering the composite image on a substrate by use of a plurality of M colorants; and recovering a desired one of the encoded source images from the rendered composite image, such that the recovered source image is made distinguishable, by subjecting the rendered composite image to an illuminant provided from an illuminant source and to the plurality of N sensors, so as to detect the resulting recovered source image;
   wherein the output spectral reflectance produced when the colorant control values are employed for each of the M colorants is given by:

$r(\lambda; A_1, A_2, \ldots A_M)$=reflectance of region with colorant control values $A_1, A_2, \ldots A_M$ at wavelength $\lambda$ wherein the relation between the control values used for each of the M colorants at a given pixel location and the response produced at a given pixel location by each of the N sensors is given by:

$f_i(A_1, A_2, \ldots A_M)$=response of i-th capture device to a region with colorant control values $A_1, A_2, \ldots A_M = \int_\lambda V_i(\lambda) r(\lambda; A_1, A_2, \ldots A_M) d\lambda$ $i=1, 2, \ldots N$ whereby the encoding of each source image is performed according to a determination for optimizing the effects of the following on at least one of the encoding, rendering, and recovery steps: (a) the spectral absorption characteristics of the colorants selected for rendering the composite image: (b) the spectral radiance characteristic of the illuminant that is used to illuminate the composite image for recovering the source image; and (c) the spectral response characteristics of the sensors used to sense the rendered composite image during such illumination, for recovery of the desired source image.

2. The method of claim 1, wherein the encoding of the source image is determined according to the interaction of the spectral absorption characteristics of the plural colorants when such colorants are combined on the substrate.

3. The method of claim 1, wherein N values $$\{Y_i\}_{i=1}^{N}$$

correspond to the desired response values from the N sensors, and wherein a set of control values for the M colorants $$\{B_j\}_{j=1}^{M}$$

are determined for use in rendering each pixel in the rendered composite image, such that for all $i=1,2,\ldots N$:

$f_i(B_1, B_2, \ldots B_M)$=response of pixel under ith capture device is $Y_i$.

4. The method of claim 1, further comprising the step of performing gamut mapping to limit at least one of the source images to one or more gamuts available in the rendering step.

5. The method of claim 1, wherein the source image encoding step further comprises the steps of:
   converting at least one source image to a monochromatic separation image; and
   mapping the monochromatic separation image to a corresponding colorant image plane in the composite image.

6. The method of claim 1, wherein the composite image is rendered as pattern including at least one narrow band colorant, of which narrow band colorant exhibiting a predefined narrow band spectral reflectance characteristic.

7. The method of claim 6, wherein the narrow band colorant is selected from the group of cyan, magenta, and yellow colorants.

8. The method of claim 6, wherein the illuminant is selected from the group of red, green, and blue narrow band illuminants.

9. The method of claim 1, wherein the rendered composite image is rendered using a color printer.

10. The method of claim 1, wherein the plurality of source images include an authentication source image and wherein the encoding of the plurality of source images provides the authentication source image embedded in the composite image.

11. An imaging system, comprising:
a spectral multiplexer for receiving image data representative of plural source images and for processing the image data to encode the source images in a composite image, and for providing a composite image data signal;
an image rendering device which is responsive to the spectral multiplexer for receiving the composite image data signal and for rendering the composite image on a substrate by use of a plurality of M colorants; and
a demultiplexer having an illuminant source for subjecting the rendered composite image on the substrate to illumination by an illuminant having a selected spectral power distribution, and a detector including a plurality of N sensors each having a respective spectral response characteristic, whereby at least one the encoded source images is detectable by subjecting the rendered composite image to an illuminant provided from the illuminant source and to the detector, so as to detect the resulting recovered source image;
wherein the output spectral reflectance produced when the colorant control values are employed for each of the M colorants is given by:

$r(\lambda; A_1, A_2, \ldots A_M)$=reflectance of region with colorant control values $A_1, A_2, \ldots A_M$ at wavelength $\lambda$ wherein the relation between the control values used for each of the M colorants at a given pixel location and the response produced at a given pixel location by each of the N sensors is given by:

$f_i(A_1, A_2, \ldots A_M)$=response of i-th capture device to a region with colorant control values $A_1, A_2, \ldots A_M = \int_\lambda V_i(\lambda) r(\lambda; A_1, A_2, \ldots A_M) d\lambda$ i1, 2...N whereby the encoding of at least one source image is performed according to a determination for optimizing the effects of the following on at least one of the encoding, rendering, and recovery steps: (a) the spectral absorption characteristics of the colorants selected for rendering the composite image; (b) the spectral radiance characteristic of the illuminant that is used to illuminate the composite image for recovering the source image; and (c) the spectral response characteristics of the sensors used to sense the rendered composite image during such illumination, for recovery of the desired source image.

12. The system of claim 11, wherein the encoding of the source image is determined according to the interaction of the spectral absorption characteristics of the plural colorants when such colorants are combined on the substrate.

13. The system of claim 11, wherein N values $\{Y_i\}_{i=1}^{N}$ correspond to the desired response values from the N sensors, and wherein a set of control values for the M colorants $\{B_j\}_{j=1}^{M}$ are determined for use in rendering each pixel in the rendered composite image, such that for all i=1,2, ... N:

$f_i(B_1, B_2, \ldots B_M)$=response of pixel under ith capture device is $Y_i$.

14. The system of claim 11, wherein the spectral multiplexer further comprises means for performing gamut mapping to limit at least one source image to the gamut available in the rendering step.

15. The system of claim 11, wherein the image rendering device is provided in the form of a printer for printing the composite image on the substrate.

16. The system of claim 11, wherein the image rendering device is operable for forming me composite image from colorants selected from the group of cyan, magenta, and yellow colorants, and wherein the demultiplexer further comprises an illuminant source operable according to an illuminant source control signal to provide an illuminant selected from the group of red, green, and blue narrow band illuminants.

17. The system of claim 11, wherein the demultiplexer further comprises a color scanner.

18. The system of claim 11, the plurality of source images including therein an authentication source image and wherein the encoding of the plurality of source images provides the authentication source image embedded in the composite image.

19. A method of processing a plurality of source images to provide a composite image, comprising the steps of:
receiving the plurality of source images, and
encoding the plurality of source images to thereby provide a composite image suitable for rendering as a rendered composite image, the encoding including mapping of source image values at pixel locations in the source images to colorant control values at respective pixel locations in a spectrally-multiplexed image plane, whereby the colorant control values specify an amount of each one of a plurality of colorants to be deposited at corresponding locations in the rendered composite image, and the rendered composite image being suited for image capture by a detector having a plurality of N sensors having respective sensitivities as a function of wavelength $\lambda$ given by $\{V_i(\lambda)\}_{i=1}^{N}$, wherein the output spectral reflectance produced when colorant control values $$\{A_j\}_{j=1}^{M}$$

are employed for each of the M colorants is given by:

$r(\lambda; A_1, A_2, A_M)$=reflectance of region with colorant control values $A_1, A_2, \ldots A_M$ at wavelength $\lambda$.

wherein the responses of the sensors to a region to be rendered with colorant control values $\{A_j\}_{j=1}^{M}$ is given by:

$f_i(A_1, A_2, \ldots A_M)$ = response of $i$-th capture device to a region with colorant control values $A_1, A_2, \ldots A_M$ $$= \int_{\lambda} V_i(\lambda) r(\lambda; A_1, A_2, \ldots A_M) d\lambda \qquad i = 1, 2 \ldots N$$

which characterizes the relation between the colorant control values employed for each of the M colorants at a given pixel location and the response produced at the given pixel location by each of the N sensors;

whereby the mapping of the pixel values from the plurality of source images is determined according to: (a) a plurality of spatial luminance distributions each of which represent the desired response of the rendered composite image to illumination Thereof by a respective one of a plurality of narrow band illuminants, and (b) the spectral response characteristics of the N sensors.

20. The method of claim 19, wherein the mapping of pixel values includes adjusting the colorant control values to compensate for unwanted absorption of at least one of the narrow band illuminants by at least one of the colorants.

21. The method of claim 20, wherein the colorant is selected from the group consisting of cyan, magenta, yellow, and black colorants, and the narrow band illuminant is selected from the group consisting of red, green, and blue illuminants.

22. The method of claim 19, wherein the mapping of pixel values includes adjusting the colorant control values to produce first and second spatial luminance distributions when the rendered composite image is subjected to respective first and second narrow band illuminants, the first spatial luminance distribution having a constant density, and the second spatial luminance distribution having a spatially-varying density.

23. The method of claim 19, wherein the mapping of pixel values includes a gamut mapping step to limit the mapping to a predetermined system gamut according to a determination of realizable luminance values.

24. The method of claim 19, further comprising the step of rendering the composite image to produce the rendered composite image on a substrate.

25. The method of claim 24, wherein the rendering step is performed by a hardcopy reprographic device selected from the group consisting of: inkjet, dye sublimation, electrophotographic, xerographic, photographic, lithographic, offset, letterpress, and gravure printing apparatus.

26. A rendered composite image, produced according to the method of claim 19.

27. A spectral multiplexer for receiving image data representative of plural source images and for processing the image data to thereby provide a composite image for rendering as a rendered composite image, comprising:

an image processing unit for receiving the plurality of source images and for encoding the plurality of source images to thereby provide the composite image;

wherein the encoding includes mapping of source image values at pixel locations in the source images to colorant control values at respective pixel locations in a spectrally-multiplexed image plane, the colorant control values specifying an amount of each one of a plurality of colorants to be deposited at corresponding locations in the rendered composite image such that the rendered composite image being suited for image capture by a detector having a plurality of N sensors each having respective sensitivities as a function of wavelength $\lambda$ given by $\{V_i(\lambda)\}_{i=1}^{N}$, wherein the responses of the sensors to a region of colorants specified by colorant control values $$\{A_j\}_{j=1}^{M}$$

is given by:

$f_i(A_1, A_2, \ldots A_M)$=response of $i$-th capture device to a region with colorant control values $A_1$, $A_2, \ldots A_M = \int_{\lambda} V_i(\lambda) r(\lambda; A_1, A_2, \ldots A_M) d\lambda$ $i=1, 2 \ldots N$ wherein the set of N functions characterizes the relation between the control values $\{A_j\}_{i=1}^{M}$ used for each of the M colorants at a given pixel location and the response produced at the given pixel location by each of the N sensors;

and wherein the mapping of the pixel values from the plurality of source images is determined according to: (a) a plurality of spatial luminance distributions each of which represent the desired response of the rendered composite image to illumination thereof by a respective one of a plurality of narrow band illuminants, and (b) the spectral response characteristics of the N sensors; and an interface for providing the composite image.

28. A computer program embodied on a computer readable medium, the program being executable for processing a plurality of source images to provide a composite image, comprising the steps of:

receiving the plurality of source images, and encoding the plurality of source images to thereby provide a composite image suitable for rendering as a rendered composite image, the encoding including mapping of source image values at pixel locations in the source images to colorant control values at respective pixel locations in a spectrally-multiplexed image plane, whereby the colorant control values specify an amount of each one of a plurality of colorants to be deposited at corresponding locations in the rendered composite image, and the rendered composite image being suited for image capture by a detector having a plurality of N sensors having respective sensitivities as a function of wavelength $\lambda$ given by $\{V_i(\lambda)\}_{i=1}^{N}$;

wherein the output spectral reflectance produced when colorant control values $\{A_j\}_{j=1}^{M}$ are employed for each of the M colorants is given by:

$r(\lambda; A_1, A_2, \ldots A_M)$=reflectance of region with colorant control values $A_1, A_2, \ldots A_M$ at wavelength $\lambda$ wherein the responses of the sensors to a region to be rendered with colorant control values $\{A_j\}_{j=1}^{M}$ is given by:

$f_i(A_1, A_2, \ldots A_M)$=response of i-th capture device to a region with colorant control values $A_1$, $A_2, \ldots A_M = \int_\lambda V(\lambda) r(\lambda; A_1, A_2, \ldots A_M) d\lambda$ $i=1, 2 \ldots N$ which characterizes the relation between the colorant control values employed for each of the M colorants at a given pixel location and the response produced at the given pixel location by each of the N sensors;

whereby the mapping of the pixel values from the plurality of source images is determined according to: (a) a plurality of spatial luminance distributions each of which represent the desired response of the rendered composite image to illumination thereof by a respective one of a plurality of narrow band illuminants, and (b) the spectral response characteristics of the N sensors.

29. The computer program of claim 28, wherein the mapping of pixel values from the plurality of source images includes adjusting the colorant control values to compensate for unwanted absorption of at least one of the narrow band illuminants by at least one of the plurality of colorants.

30. The computer program of claim 28, wherein the mapping of pixel values includes adjusting the colorant control values to produce first and second spatial luminance distributions in the rendered composite image when the rendered composite image is subjected to first and second narrow band illuminants, the first spatial luminance distribution having a constant density, and the second spatial luminance distribution having a spatially-varying density.

31. The computer program of claim 30, wherein the mapping of pixel values includes a gamut mapping step to limit the source images to a predetermined system gamut according to a determination of realizable luminance values.

32. The computer program of claim 31, wherein the plurality of source images includes therein an authentication source image and wherein the encoding of the plurality of source images provides the composite image with the authentication source image embedded therein.

* * * * *